Patented Sept. 19, 1944

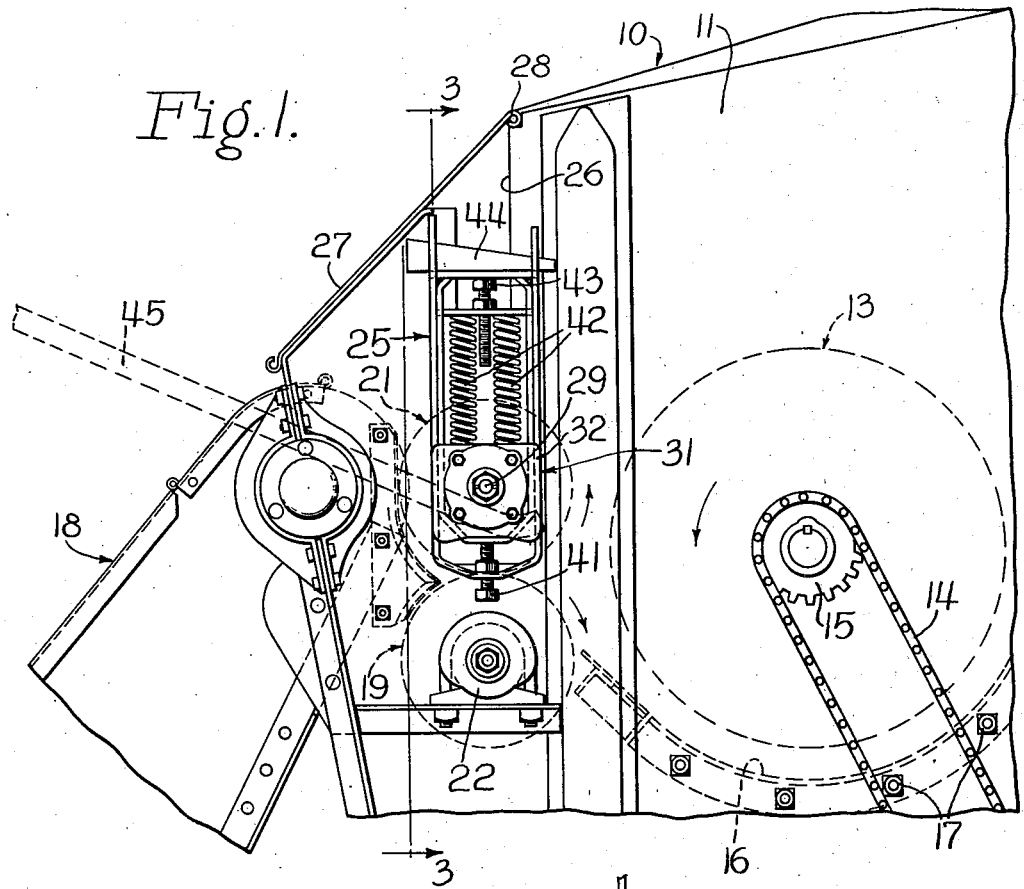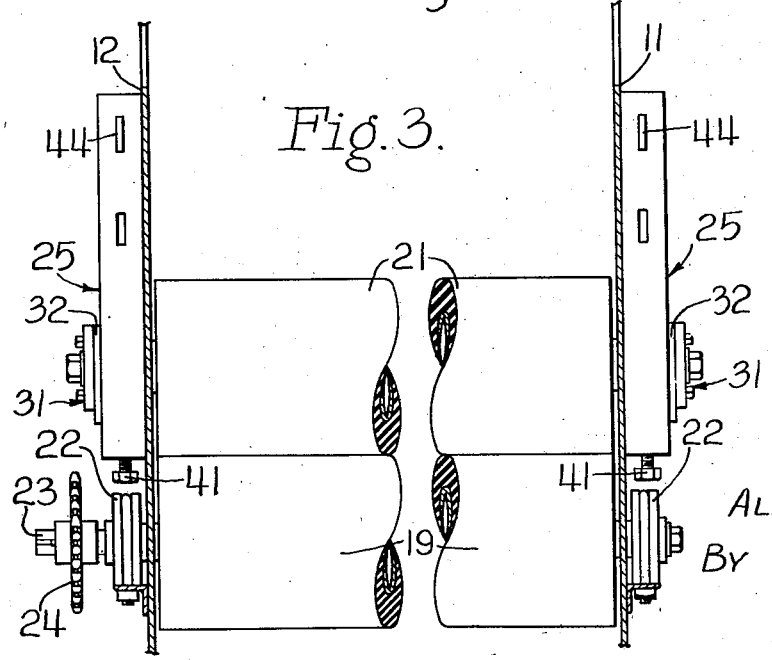

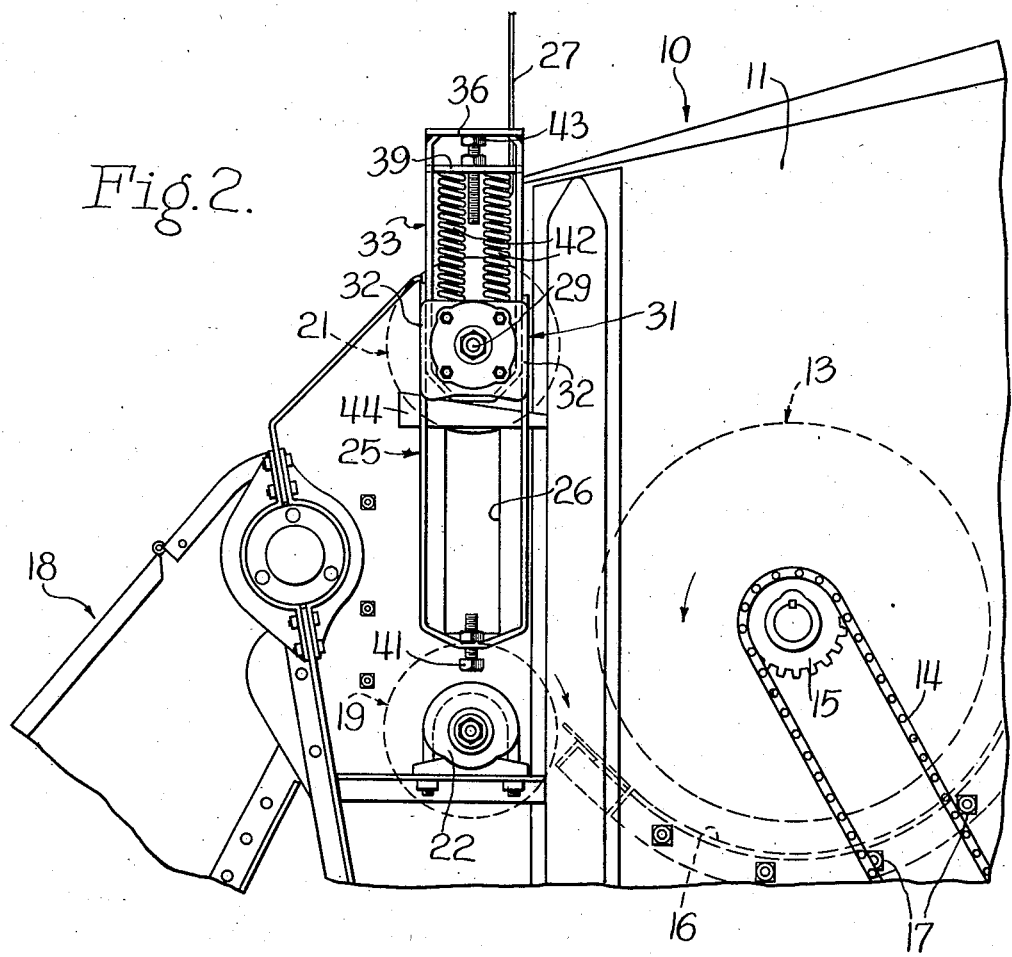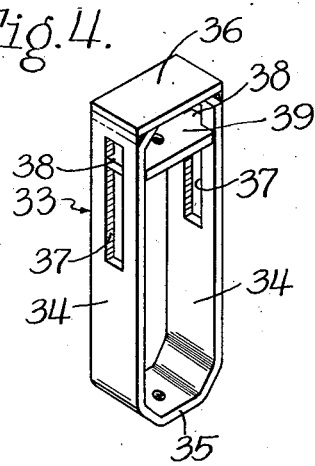

2,358,548

UNITED STATES PATENT OFFICE 2,358,548

THRESHER

Albert B. Welty, Moline, Ill., assignor to International Harvester Company, a corporation of New Jersey Application March 24, 1941, Serial No. 384,778

5 Claims. (Cl. 130—1)

The present invention relates to threshers. More specifically the invention relates to a novel flax roll attachment for threshers.

When harvesting flax or other similar crops, it is desirable to provide a pair of rubber rolls between the feeder and the cylinder of the thresher. The thresher may be either a mobile or stationary type machine. The purpose of the rubber rolls is to compress the material which comes from the feeder so that the material may be conveyed into the cylinder of the machine in somewhat of a flat mass. However, many times there is a tendency for this mass of material to be conveyed into the cylinder faster than the cylinder can thresh it. Consequently, this excess amount of material in the cylinder prevents the efficient operation thereof. This excess amount of material, which is conveyed into the cylinder, is commonly referred to as choking the cylinder and will hereafter be referred to by this term. Since the rubber rolls yieldingly engage one another, it is practically impossible with the present day harvesters to unchoke the cylinder. The slug of material cannot be handled by the cylinder so, therefore, it must be removed therefrom.

With these above points in view, it is an important object of the present invention to provide a rubber roll attachment for a thresher whereby the rubber rolls may be quickly moved to such a position that the slug may be removed from the cylinder. In other words, the rolls are moved apart for unchoking the cylinder.

Another object of the present invention is to provide a novel means for mounting the rubber rolls.

Another object of the present invention is to mount one of the rolls in a carrier which may be locked in an operating position or raised to and locked in an inoperative position.

According to the present invention, the upper rubber roll is journaled in a carrier, which is adapted to be carried by a suitable structure provided above the lower rubber roll which is journaled in the side sheets of the separator. A latch means is associated with the carrier in such a manner that the carrier may be locked in an operating position or moved to and locked in an inoperative position. In the inoperative position the rubber rolls are a sufficient distance apart to permit removal of the slug of material that is choking the cylinder.

By virtue of this particular construction a novel and quickly adjustable means is provided for adjusting the rubber roll attachment of a thresher.

These and other objects and advantages of the present invention will be apparent to those skilled in the art after a consideration of the following detailed description of the preferred structural embodiment, taken in conjunction with the accompanying drawings.

In the drawings:

Figure 1 is a side view of a portion of a thresher in which the novel rubber roll attachment is provided, and which shows the rubber roll attachment in an operating position;

Figure 2 is a side view similar to Figure 1, but shows the rubber roll attachment moved to an inoperative position.

Figure 3 is a sectional view taken along the line 3—3 of Figure 1; and,

Figure 4 is a perspective view of the carrier for the upper rubber rolls.

Referring now to the drawings and more particularly to Figure 1, it will be noted that the thresher chosen to illustrate the principle of the present invention comprises a separator 10, which consists of vertical side sheets 11 and 12. In the side sheets 11 and 12 is journaled a conventional threshing cylinder 13, which is adapted to be driven by a chain 14 that is trained around a suitable sprocket 15 associated with the cylinder 13. The chain 14 is driven from any suitable source of power for driving the thresher. Below the cylinder 13 is provided a concave 16 which is secured to the side sheets 11 and 12 by a plurality of bolts 17. While the threshing cylinder 13 has only been indicated by a dotted line, it is to be understood that the usual threshing teeth are provided thereon, and also that the usual openings are provided in the concave 16 through which the threshed material may fall. On the forward portion of the separator 10 is pivotally mounted a feeder 18. In the case of the mobile type of thresher, the usual platform would be associated with the feeder and, in the event it is a stationary thresher, the feeder 18 merely acts as a conveyor means for delivering material into the cylinder 13. A suitable conveying structure is provided in the feeder 18. Intermediate the discharge end of the feeder 18 and the receiving portion of the cylinder 13 is mounted the novel flax roll, or rubber roll attachment.

The flax roll attachment comprises a lower roll 19 and an upper roll 21. The upper and lower rolls 19 and 21, respectively, may be made of any suitable material; however, it has been found that a rubber covering on these rolls produces satisfactory results. The lower roll 19 is journaled in a suitable bearing 22, one of which is provided at each side of the side sheets 11 and 12. A shaft 23 extends from the lower roll 19 beyond the side sheet 12 and has a sprocket 24 secured thereto. A suitable chain may be trained around the sprocket 24 so as to drive the lower roll 19. The upper roll 21 is movably associated with respect to the lower roll 19.

At each side of the separator 10 and on the side sheets 11 and 12 is secured a U-shaped bracket structure 25, as shown in Figures 1 and 3. The open end of the bracket structure is provided at the top. Between the sides of the U-shaped bracket structure and in the side sheets 11 and 12 are provided openings 26. A door 27 is pivotally mounted at 28 on the separator 10 and extends forwardly and downwardly so as to close the gap between the top of the separator 10 and the upper end of the feeder 18. The door 27 also permits access to the cylinder 13. The upper roll 21 has a shaft 29 which extends from either end thereof. Each end of the shaft 29 is journaled in a bearing 31 which is provided with a flange portion 32. The bearings 31 are adapted to be mounted in a carrier frame 33. One of the frames 33 is associated with the U-shaped brackets provided at each side of the machine. Referring to Figure 4, it is noted that the carrier frame 33 is of U-shape and comprises parallel sides 34 and an end portion 35. A plate member 36 is welded to the open end of the parallel sides 34. The sides 34 are also provided with slots 37 in which the projections 38 of a plate 39 are adapted to fit. The bearings 31 and the carrier frames 32 are inserted in the U-shaped brackets 25, the flanges 32 of the bearings overlapping the sides 34 of the carrier 32 and the sides of the U-shaped bracket 25, as shown in Figures 1 and 3. The frame 32 and bearing 31 along with associated parts to be described presently may be regarded as a carrier for one end of the upper roll 21.

When the upper roll 21 and the carrier frame 33 are inserted in the machine the roll 21 will move into contact with the lower roll 19. In the event that a space is desired between the upper and lower rolls, the nut and bolt 41 at the closed end of the U-shaped bracket 25 may be adjusted so as to move the upper roll 21 slightly away from the lower roll 19. The bearings 31 of the upper roll 21 are adapted to move up and down with respect to the carrier frame 33. The bearings 31 of the upper roll 21 are normally held against the bolt 41 by means of a pair of springs 42 which are inserted between the bearings 31 and the plate 39. A suitable nut and bolt is provided between the plate 39 and the plate 36 for adjusting the plate 39 with respect to the plate 36. In other words, upon adjusting the bolt 43, the tension of the springs 42 is increased or decreased. The entire carrier frame 32 is held in the U-shaped bracket provided at the sides of the separator 10 by a wedge 44 which is inserted in suitable openings provided in the sides of the U-shaped bracket 25, as illustrated in Figures 1 and 3. Because the member 44 is a wedge, it may be shifted laterally so as to be kept properly in engagement with the top of the carrier member 32 as the carrier member is adjusted up or down by means of the nut and bolt 41. In an operating position the rubber rolls are in the position shown in Figure 1. In the event the tension on the upper rubber roll 21 need be decreased, the bolt 41 is turned in one direction; and in the event the tension is to be increased on the upper roll 21, the bolt 43 is turned in the other direction. When the rolls are in position, material which is conveyed by the feeder 18 is compressed by the rolls 19 and 21, from which it passes into the threshing cylinder 13, and thence out of the machine in the usual manner.

When it is necessary to unchoke the cylinder, the upper roll 21 is moved to the position shown in Figure 2. Since the upper roll 21 is journaled in the bearings 31, which are in turn carried by the carrier frame 32, the carrier frames 33 and the upper roll 21 may be moved as a unit to the position shown in Figure 2. The wedge 44 is removed from the U-shaped bracket 25, and any suitable bar 45 is inserted beneath the bearings 31 and any suitable projection from the separator 10, which in this case happens to be the bearing for the feeder 18, so as to move the upper roll unit into the position shown in Figure 2. The wedge 44 is then inserted in a pair of alined openings provided in the U-shaped bracket structure 25 so as to hold the upper roll 21 in its elevated position. The cylinder 13 is then rotated in the direction opposite to the direction in which it operates. This movement of the cylinder moves the slug of material outwardly onto the lower roll 19. Since the door 27 is in its raised position, the operator may easily reach into this opening and remove the mass of material from the cylinder of the machine. After the cylinder has been unchoked, the wedge 44 is then removed from the position shown in Figure 2, and the upper roll 21 moved to the position shown in Figure 1. The wedge 44 is then inserted so as to hold the upper roll 21 adjacent the lower roll 19.

From the foregoing description, it should be apparent that a novel means has been provided for adjusting the flax roll attachment of a harvester. The novel adjustment of the rolls permits the cylinder of the machine to be quickly and easily unchoked. The adjustment can also be made with a minimum of adjustments, and after the upper roll has been raised to its upper position, it will always seat itself in the lower position which it had prior to the adjustment.

While only a preferred construction in which the principles of the present invention have been embodied has been described, it is to be noted that the invention is not to be limited to the specific details shown and described, but that in fact, widely different means may be employed in the practice of the broader aspects of the invention.

What is claimed is:

1. The combination with a pair of spaced walls, a pair of upper and lower feed rolls extending between the walls, and means for mounting the lower feed roll in a fixed position in the walls, of means for mounting the upper feed roll either in a lower operative position adjacent the lower feed roll or in an upper inoperative position spaced from the lower roll, said means comprising U-shaped brackets open at the top secured in the walls adjacent the top thereof, carriers supporting the ends of the upper feed roll and being slidable in the brackets, and elements insertable through the brackets and engageable either with the top of the carriers for retaining them in a lower position in which the carriers support the upper roll in its said lower operative position adjacent the lower roll or with the bottom of the carriers for supporting them in an upper position in which they support the upper roll in its said upper inoperative position spaced from the lower roll and project beyond the top of the walls.

2. The combination with a pair of spaced walls, a pair of upper and lower feed rolls extending between the walls, and means for mounting the lower feed roll in a fixed position in the walls, of means for mounting the upper feed roll either in a lower operative position adjacent the lower feed roll or in an upper inoperative position spaced from the lower roll, said means comprising U-shaped brackets open at the top secured in the walls adjacent the top thereof, carriers supporting the ends of the upper feed roll and being slidable in the brackets, and elements either insertable through the brackets at one point for engagement with the top of the carriers for retaining them in a lower position in which the carriers support the upper roll in its said lower operative position adjacent the lower roll or insertable through the brackets at another lower point for engagement with the bottom of the carriers for holding them in an upper position in which they support the upper roll in its said upper inoperative position spaced from the lower roll and project beyond the top of the walls.

3. The combination set forth in claim 1 and further including means for adjusting the lower operative position of the upper feed roll, said means comprising parts adjustably secured to the base of the brackets and projecting upwardly therefrom so as to engage the bottom of the carriers.

4. The combination set forth in claim 1 and further including means for adjusting the lower operative position of the upper feed roll, said means comprising parts adjustably secured to the base of the brackets and projecting upwardly therefrom so as to engage the bottom of the carriers, the elements insertable through the brackets as set forth in claim 1 being of wedge shape so as to provide by lateral shifting an under surface movable up or down for proper engagement with the top of the carrier members as they move up or down as an incident to adjustment of their lower operative position.

5. In a thresher construction comprising a pair of spaced side walls, a pair of upper and lower feed rolls extending between the walls, and means mounting the lower roll in a fixed position in the walls, the combination therewith of means for relieving choking of the feed rolls, said means comprising a door extending between the side walls at the top thereof, U-shaped brackets open at the top secured in the walls adjacent the top thereof and the door, carriers supporting the ends of the upper roll and slidably mounted on the brackets, means insertable in the brackets for engaging the bottom of the carriers so as to support the upper roll in inoperative position spaced from the lower roll or for engaging the top of the carriers so as to hold the upper roll in operative position adjacent the lower roll, whereby for relieving of choking of the feed rolls, the door is opened, the insertable means is removed so as to permit raising of the carriers and the upper roll until the means is reinserted to engage the bottom of the carriers, and the carriers project upwardly beyond the top of the side walls, and the resulting increased spacing between the rolls relieves the choking and permits the removal of choking material.

ALBERT B. WELTY.